(12) United States Patent
Fallows et al.

(10) Patent No.: US 8,527,774 B2
(45) Date of Patent: Sep. 3, 2013

(54) SYSTEM AND METHODS FOR PROVIDING STATELESS SECURITY MANAGEMENT FOR WEB APPLICATIONS USING NON-HTTP COMMUNICATIONS PROTOCOLS

(75) Inventors: John R. Fallows, San Jose, CA (US); Frank J. Salim, Mountain View, CA (US)

(73) Assignee: Kaazing Corporation, Mountain View, CA (US)

( * ) Notice: Subject to any disclaimer, the term of this patent is extended or adjusted under 35 U.S.C. 154(b) by 455 days.

(21) Appl. No.: 12/788,938

(22) Filed: May 27, 2010

(65) Prior Publication Data

US 2010/0306547 A1  Dec. 2, 2010

Related U.S. Application Data

(60) Provisional application No. 61/181,924, filed on May 28, 2009.

(51) Int. Cl.
*H04L 29/06* (2006.01)
(52) U.S. Cl.
USPC ............................... 713/178; 713/168; 726/9
(58) Field of Classification Search
USPC ............................................. 713/178; 726/9
See application file for complete search history.

(56) References Cited

U.S. PATENT DOCUMENTS 5,586,260 A * 12/1996 Hu .................................. 726/12
6,934,706 B1 * 8/2005 Mancuso et al. ..................... 1/1
7,760,882 B2 * 7/2010 Tidwell et al. ................. 380/270
8,046,823 B1 * 10/2011 Begen et al. ....................... 726/3
2004/0088349 A1 * 5/2004 Beck et al. ..................... 709/203
2006/0146767 A1 * 7/2006 Moganti ......................... 370/338
2006/0206614 A1 * 9/2006 Kaczmarski et al. ......... 709/228
2009/0300740 A1 * 12/2009 Verma et al. ....................... 726/6

OTHER PUBLICATIONS

Yanhai Zhou, Jianghong Han, Xuesen Ma, Wireless Communications, Networking and Mobile Computing, 2007. WiCom 2007. International Conference on, pp. 3003-3006.*
Kifer et al., "Database Systems: An Application-Oriented Approach", 2005, Addison-Wesley, Second Edition, pp. 44, 76-78.*

* cited by examiner

*Primary Examiner* — Peter Shaw
*Assistant Examiner* — Ali Shayanfar
(74) *Attorney, Agent, or Firm* — Van Pelt, Yi & James LLP (57) ABSTRACT

A gateway server interoperates with client and remote server systems to provide stateless security management for a distributed Web application. A Web client application on the client system initiates a WebSocket connection directed to a remote Web service by performing an authentication challenge directed to a user of the Web-browser client where a secure token is not present in a local store instance corresponding to the client application. The authentication challenge obtains the user credentials and then exchanges the user credentials with the gateway server for a secure token. The secure token is then sent in a protocol specific connect message to the gateway server. The gateway server, in response to receipt of the connect message, initiates a WebSocket connection directed to the remote Web service by inspecting the connect message to recover the secure token, evaluating the secure token to obtain user credentials, injecting the secure token with the user credentials, and sending the connect message to the remote Web service.

21 Claims, 5 Drawing Sheets

SYSTEM AND METHODS FOR PROVIDING STATELESS SECURITY MANAGEMENT FOR WEB APPLICATIONS USING NON-HTTP COMMUNICATIONS PROTOCOLS

This application claims the benefit of U.S. Provisional Application No. 61/181,924, filed May 28, 2009.

BACKGROUND OF THE INVENTION

1. Field of the Invention

The present invention is generally related to establishing secure connections between Web-application clients and servers communicating using non-HTTP protocols and, in particular, to a gateway server mediated secure authentication and credential management system supporting for Web-browser based Web application clients connecting with remote server-based Web services using non-HTTP communications protocols.

2. Description of the Related Art

A substantial aspect of the ongoing development of Web-based technologies is directed to providing increased support for distributed, networked applications. This effort has resulted in the development of WebSockets as a connection-oriented basis for bidirectional transmission of data between Web-browser based client applications and Web services provided on server systems remotely located relative to the Web-browser based client applications.

Distributed, network applications are conventionally architected using a client-server model where the client executes a dedicated application that ideally communicates through a persistent, bidirectional connection with a server system executing a corresponding service application. Authentication credentials are supplied by the client during initialization of the connection. The authentication persists until the client application releases the connection or otherwise shuts down. While the connection is operational, the client and server communicate using whatever protocol is most appropriate for the service provided and the nature of the data being exchanged.

Conventional Web-browser clients are, however, page and HTTP protocol oriented. By design, conventional Web-browsers will tear down existing local state whenever the client transitions from one page to another. Connections, including any related authentication data, are held as document or page oriented local state. Page transitions therefore naturally result in the termination of existing connections. Non-page state data can be stored by conventional Web-browser clients as cookies. Allocated by the server system, these cookies can be manipulated to store information that allows authenticated connections to be autonomously restored as needed for the duration of a server defied session. Access to and manipulation of session cookies in this manner is effectively limited to use of the HTTP protocol as natively supported by conventional Web-browser clients. Although the WebSockets protocol allows conventional HTTP cookies to be transmitted during the initial connection phase of establishing a WebSockets connection, the higher-level protocols hosted on WebSocket connections cannot access or use these cookies.

Consequently, a need exists for a system and methods that will allow WebSocket and other non-HTTP protocol connections to be utilized between Web-browser client and server applications while functionally maintaining state in a secure manner subject to the conventional operational nature of Web-browser clients.

SUMMARY OF THE INVENTION

Thus, a general purpose of the present invention is to provide a system and methods of enabling Web-browser clients to securely establish and manage state information in relation to WebSocket and other non-HTTP protocol connections.

This is achieved in the present invention by providing a gateway server that interoperates with client and remote server systems to provide stateless security management for a distributed Web application. A Web client application on the client system initiates a WebSocket connection directed to a remote Web service by performing an authentication challenge directed to a user of the Web-browser client where a secure token is not present in a local store instance corresponding to the client application, the authentication challenge obtaining and then exchanging user credentials with the gateway server for a secure token. The secure token is then sent in a protocol specific connect message to the gateway server. The gateway server, in response to receipt of the connect message, initiates a WebSocket connection directed to the remote Web service by inspecting the connect message to recover the secure token, evaluating the secure token to obtain user credentials, injecting the secure token with the user credentials, and sending the connect message to the remote Web service.

An advantage of the present invention is that user credentials can be managed and used efficiently to maintain authenticated connections with remote Web services using various protocols including, in particular, non-HTTP protocols hosted on WebSocket connections.

Another advantage of the present invention is that the gateway server utilized in connection with the present invention is not burdened with stateful user information that would be difficult to manage under many error and failure scenarios. Management of stateful information through a cooperative relation between the client systems and gateway system is effective, secure, and reduces memory and CPU demands on the gateway server, thus enhancing performance and scalability. Further, the cooperative relation with the gateway server allows the client systems to utilize the gateway server as a single interface to a variety of standard authentication systems, thereby simplifying client system administration.

A further advantage of the present invention is that the client systems execute Web-browser based client applications and maintain state information within the security model of conventional Web-browsers. While state information storage on client systems is largely secure, a cooperative authentication relation with the gateway server ensures that essential authentication information remains secure even as stored on conventional client systems and within the security model of conventional Web-browsers. The communications required to implement the cooperative authentication relationship with the gateway server is minimal. Secure credentials, used as the basis for establishing authenticated state, are stored local and persistent so as to survive beyond Web-browser restarts and session terminations.

Still another advantage of the present invention is that the cooperative authentication relation with the gateway server is established effectively at a WebSockets protocol level, allowing authenticated connections to be established without inherent domain constraints. While authentication is constrained in relation to the site of a Web-client application, any constraints related to the domain of the gateway server and of connected Web-services is determined by service access controls implemented by the gateway server. The service access controls are administratively configured.

DETAILED DESCRIPTION OF THE INVENTION

The present invention provides support for distributed Web applications to efficiently authenticate and maintain secure communication channels while exchanging data in real-time between Web-browser clients and remote Web services. The preferred embodiments of the present invention utilize a gateway server as an intermediary security manager. This gateway server preferably also implements the functions described in the co-pending application Enterprise Client-server System and Methods of Providing Web Application Support Through Distributed Emulation of WebSocket Communications, filed Apr. 30, 2010 and assigned to the assignee of the present application, which is hereby incorporated by reference. In summary, the gateway server described in the incorporated application enables socket-oriented, bidirectional, real-time communications between Web-browser based client applications and data services hosted by remote server systems. In the following detailed description of the invention like reference numerals are used to designate like parts depicted in one ore more of the figures.

Figure 1:
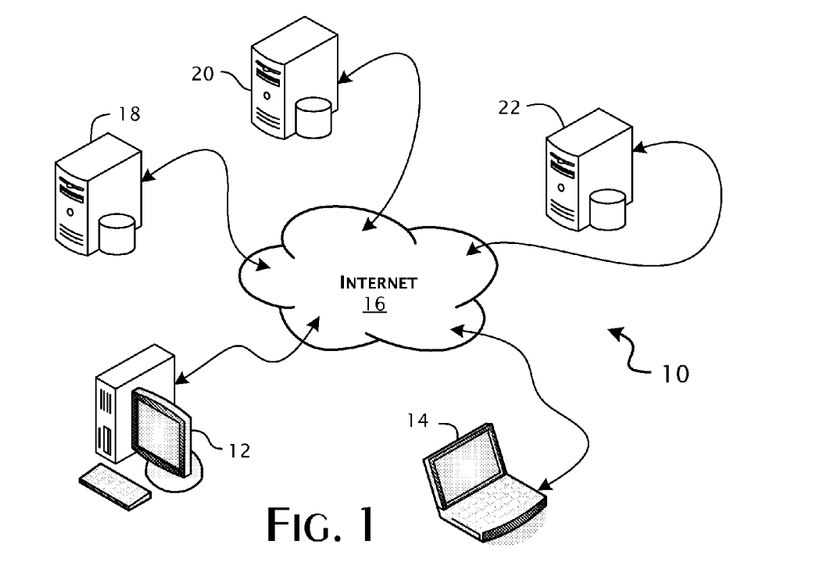
FIG. 1 is a general illustration of a preferred operating environment for a preferred embodiment of the present invention.

A preferred operating environment of the present invention 10, representing the implementation of a distributed Web application, is generally shown in FIG. 1. Conventional client systems 12, 14 execute Web-browser based client applications that operationally access, through the public Internet, private intranet, or other communications network 16, one or more remote server systems 18, 20, 22 to bidirectionally request and receive real-time information. In typical instances, an information request made through a Web-browser client, executed by a client system 12, is directed initially to a primary or source server 18 and real-time, bidirectional information feed connections are established, as needed with other secondary servers 20, 22. For example, a Web-page may be requested from the source server 18 that, within appropriate, designated window areas within the user interface representation of the delivered page, presents real-time news stories from a news source server 20 and stock pricing information from a stock information server 22. Through implementation and use of the present invention, such information feed connections can be effectively continued across page transitions that may occur in the execution of the client application within the context of the Web-browser client. That is, while active WebSocket connections will be abruptly terminated as a consequence of the underlying teardown of HTTP connections, the present invention provides for the retention and management of connection information at the level of the WebSocket connections sufficient to allow the connections to be selectively restored without apparent interruption to the end user of the Web-browser client.

Figure 2:
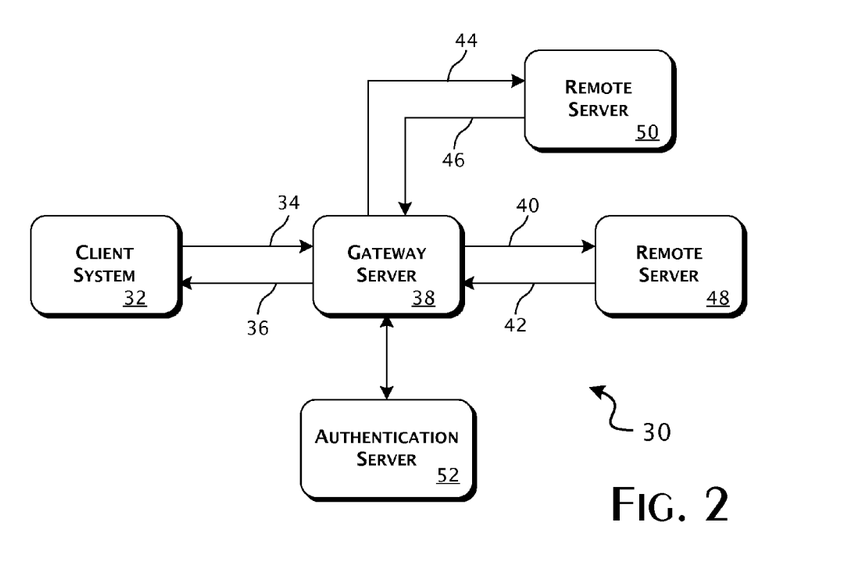
FIG. 2 is a block diagram illustrating a preferred client/server system appropriate for the implementation of a preferred embodiment of the present invention in implementing a distributed client/server Web application.

In accordance with the present invention, a gateway service is provided to participate in the management of WebSocket connections ultimately established between Web-browser client applications and remote Web services. As illustrated in FIG. 2, the preferred system architecture 30 of the present invention enables a client computer system 32 to communicate through a bidirectional WebSocket connection 34, 36 with a gateway server 38. Separate bidirectional WebSocket connections 40, 42 and 44, 46 connects the gateway server 38 with remote servers 48, 50 as appropriate to access respectively hosted Web services. The gateway server 38 can concurrently support multiple client systems 32 accessing multiple remote Web services and each remote server 48, 50 can provide multiple Web services. In alternate embodiments, the gateway server 38 can also locally implement Web services accessible to client systems 32. Preferably, the gateway server implements an authentication service, either directly or with the support of an external authentication server 52, implementing an LDAP, Kerberos, Java Authentication and Authorization Service (JAAS), or other standards-based credentials service.

The gateway server 38 performs a number of functions in management of WebSocket connections on behalf of the systems 32. These functions include management, in concert with the Web-browser client application, of an authentication token keyring, security enhanced proxy processing of select protocol specific data packets passed through the gateway server 38, and client user authentication services for single and, selectively, multiple protocols applicable to multiple services provided by one or more remote services. In implementing these features, the gateway server 38 is responsible for selectively modifying protocol data packets that traverse the gateway server 38. In the preferred embodiments, the gateway server 38 operates to selectively inject security credentials into protocol data packets transmitted to remote servers 48, 50. Secure credential tokens are injected into select returned protocol data packets. As implemented in presently preferred embodiments, the credential tokens, as stored by a client system 32, are effectively secure against tampering and misuse. While the security credentials are present on the gateway server 38, they are present only transiently and are thus similarly secure against tampering and misuse. Together, a client system 32 and gateway server 38 interoperate to efficiently support the secure user identification and authentication of real-time communications between the client 32 and remote server systems 48, 50.

Figure 3:
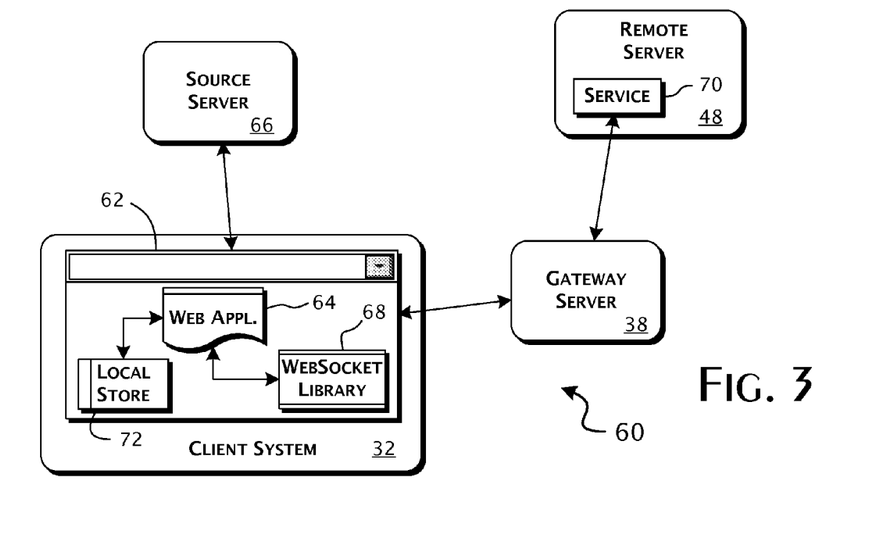
FIG. 3 provides a detailed block diagram illustrating a Web-browser client configured for implementing a client-side application in conjunction with a distributed client/server Web application consistent with a preferred embodiment of the present invention.

A more detailed system embodiment 60 is shown in FIG. 3. In the preferred embodiments, a Web-browser client application 62 is executed on a client system 32 in response to end-user action. Typically, based on end-user input, a Web page containing a Web-client application 64 is loaded from a remote application source server 66. In the preferred embodiments of the present invention, the Web-client application 64 includes or is responsible for the loading of a WebSocket library 68. As detailed further in the incorporated co-pending application, the WebSocket library 68 provides emulated WebSocket services for pre-HTML5 compliant Web-browser client applications 62, as needed, as well as protocol-specific client libraries for both pre-HTML5 compliant and fully HTML5 compliant Web-browser clients 62.

The specific set of client protocol libraries included in any particular distribution of the WebSocket client library 68 is typically dependent on design time choices made by or for the developer of the Web-client application 64. As deployed, the Web-client application 64 preferably identifies a particular instance of the WebSocket library 68 for loading by the Web-browser client 62 instance. In execution of the Web-client application 64, the WebSocket library 68 is utilized to establish WebSocket connections to a gateway server 38. Corresponding connections are made to remote services 70 that are remotely hosted, such as on remote server 48.

Preferably, a keyring library is included in or, alternately, retrieved in combination with the WebSocket library 68. The keyring library is utilized by the Web-client application 64 to establish one or more local store 72 instances. The keyring library further supports the Web-client application 64 by providing functions for establishing a keyring data structure within local store 72 instances and for accessing the keyring data structure, including finding, adding, and removing keys from the keyring data structure. The keyring library is preferably utilized by the Web-client application 64 in combination with the WebSocket library 68 to provide secure key management functions regardless of whether the WebSocket library 68 uses the native WebSocket capabilities of an HTTP5 compliant Web-browser client application 62 or provides emulated WebSocket capabilities for a pre-HTTP5 compliant Web-browser client application 62.

In the preferred embodiments of the present invention, a Web-client application 64 is designed and developed for a particular use, such as supporting a chat session or displaying a real-time data feed. Each Web-client application 64 is initially coded with a communications protocol type identifier, a keyring data structure name, a gateway server identifier, and a remote Web-service identifier, each as appropriate for the intended use of the Web-client application 64. In the presently preferred embodiments of the present invention, the gateway identifier and remote Web-service identifier are encoded together as a URL and port value. This information is sufficient for a Web-client application 64 to select an appropriate secure token for transmission to a gateway server 38 appropriate to reach the identified Web-service. In alternate embodiments of the present invention, the Web-service identifier may be further resolved by the gateway server 38 to allow selection of the remote server 48 and Web service 70 from among multiple Web servers providing an equivalent Web services 70, for purposes such as load balancing.

Figure 4:
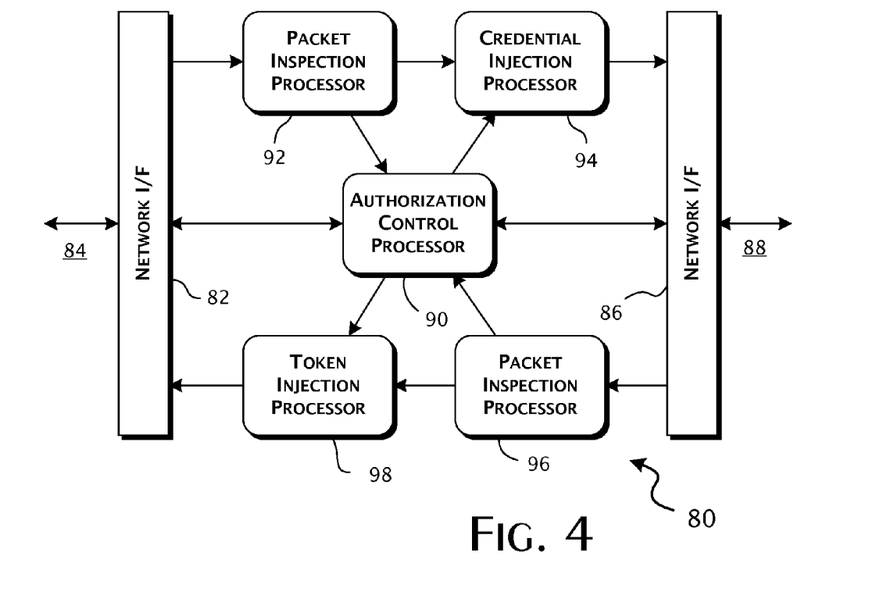
FIG. 4 provides a block diagram of a preferred implementation of a gateway server as implemented in a preferred embodiment of the present invention.

Referring to FIG. 4, a preferred implementation 80 of a gateway server 38 is shown. In the preferred embodiments, the gateway server 38 is implemented on a conventional Web server system configured to support network connections between clients systems 32 and remote servers 48, 50. Functionally, a client network interface 82 supports network connections 84 with Web-browser clients applications 64. A server network interface 86 supports network connections with remote servers 48, 50 and authentication servers 52. The client and server network interfaces 82, 86 may be implemented using the same or separate physical network interface controllers.

An authorization control processor 90 and related packet processors 92, 94, 96, 98 are preferably implemented as event driven modules hosted within an application server executed by the gateway server 38. The Apache MINA network application framework is used in implementing the preferred embodiments. The authorization control processor 90 preferably functions as a central controller in managing client authorization and protocol data packet processing operations. The client packet inspection processor 92 monitors incoming data packets for managed protocols and selectively reports the protocol and connection state in the context of inspected data packets to the authorization control processor 90. The credential injection processor 94 is responsible for injecting, or rewriting, selected data packets to include credentials appropriate to the protocol defined structure of a data packet. The credentials injected are provided by the authorization control processor 90 preferably based on evaluation of administratively established service access control configuration stored local to the gateway server 38. An example of a token-store service access control configuration is provided in Table 1.

TABLE 1

Service Access Control Configuration (Token)

```
<!-- Information about the session service itself -->
<session>
    <!-- Configure HTTP authentication -->
    <authentication-scheme>Basic</authentication-scheme>
    <!-- Server realm against which credentials are authenticated-->
    <realm-name>stompRealm</realm-name>
</session>
<!-- Security configuration -->
<security>
    <realm>
        <name>stompRealm</name>
        <!-- This realm checks against an LDAP-based login-module element -->
        <login-module>
            <type>ldap</type>
            <success>required</success>
            <options>
                <userProvider>
                    ldap://ldap-svr/ou=people,dc=example,dc=com
                </userProvider>
                <userFilter>
                    (&(uid={USERNAME})(objectClass=inetOrgPerson))
                </userFilter>
                <authzIdentity>{EMPLOYEENUMBER}</authzIdentity>
            </options>
        </login-module>
```

TABLE 1-continued

Service Access Control Configuration (Token)

```xml
        </realm>
</security>
<!-- Declaration of the actual keyring service, ie where the keyring connects to -->
<service>
        <accept>https://localhost:9000/keyring</accept>
        <type>keyring</type>
        <auth-constraint>
            <require-role>AUTHORIZED</require-role>
        </auth-constraint>
</service>
<!-- Declaration of the STOMP service -->
<service>
        <!-- Protocol identifier is type "stomp"; service identifier is 9000 -->
        <accept>wss://example.com:9000/stomp</accept>
        <connect>tcp://stompserver.com:61613</connect>
        <type>stomp.proxy</type>
```

An example of a session-store service access control configuration is provided in Table 2.

TABLE 1

Service Access Control Configuration (Session)

```xml
<!-- Information about the session service itself -->
<session>
        <!-- Domains to which the cookie will be attached -->
        <service-domain>.example.com</service-domain>
        <!-- Configure HTTP authentication -->
        <authentication-scheme>Basic</authentication-scheme>
        <!-- Server realm against which credentials are authenticated-->
        <realm-name>stompRealm</realm-name>
        <!-- Configure the session cookie -->
        <!-- Name of the key used to encrypt the session cookie -->
        <encryption-key-alias>session</encryption-key-alias>
        <!-- How often should the cookie auto-refresh -->
        <inactivity-timeout>1800</inactivity-timeout>
</session>
<!-- Security configuration -->
<security>
        <realm>
            <name>stompRealm</name>
            <!-- This realm checks against an LDAP-based login-module element -->
            <login-module>
                <type>ldap</type>
                <success>required</success>
                <options>
                    <userProvider>
                        ldap://ldap-svr/ou=people,dc=example,dc=com
                    </userProvider>
                    <userFilter>
                        (&(uid={USERNAME})(objectClass=inetOrgPerson))
                    </userFilter>
                    <authzIdentity>{EMPLOYEENUMBER}</authzIdentity>
                </options>
            </login-module>
        </realm>
</security>
<!-- Defines where the session service is located. The keyring connects to this location. -->
<service>
        <accept>https://www.example.com/session</accept>
        <type>session</type>
        <!-- Users role constraint -->
        <auth-constraint>
            <require-role>AUTHENTICATED</require-role>
        </auth-constraint>
</service>
<!-- Finally, declaration of the STOMP service -->
<service>
        <!-- Protocol identifier is type "stomp"; service identifier is 9000 -->
        <accept>wss://example.com:9000/stomp</accept>
        <connect>tcp://stompserver.com:61613</connect>
        <type>stomp.proxy</type>
</service>
```

As needed, the authorization control processor 90 directs the Web client application 64 to present a login challenge to a user of the client system 32 to acquire client credentials and to interoperate with the authentication server 52 to validate the returned client credentials and acquire corresponding service related credential and encryption certificates. The rewriting of managed protocol packets preferably occurs in real-time. The rewritten protocol packets are transmitted through the network interface 86 to the remote server 48, 50 at the network location determined by the authorization control processor 90.

The server packet inspection processor 96 similarly monitors incoming data packets for managed protocols and selectively reports the protocol and connection state in the context of inspected data packets to the authorization control processor 90. A token injection processor 98 is responsible for injecting, or rewriting, selected data packets to include secure tokens appropriate to the protocol defined structure of a data packet. The token injected is provided by the authorization control processor 90. Nominally, the secure token injected is the same, transaction corresponding secure token captured by the packet inspection processor 92. Preferably, a timestamp value embedded in the secure token is added or updated by operation of the authorization control processor 90 prior to injection by the token injection processor 98. Rewritten protocol packets are transmitted through the client network interface 82 to the corresponding client system 32.

Figure 5:
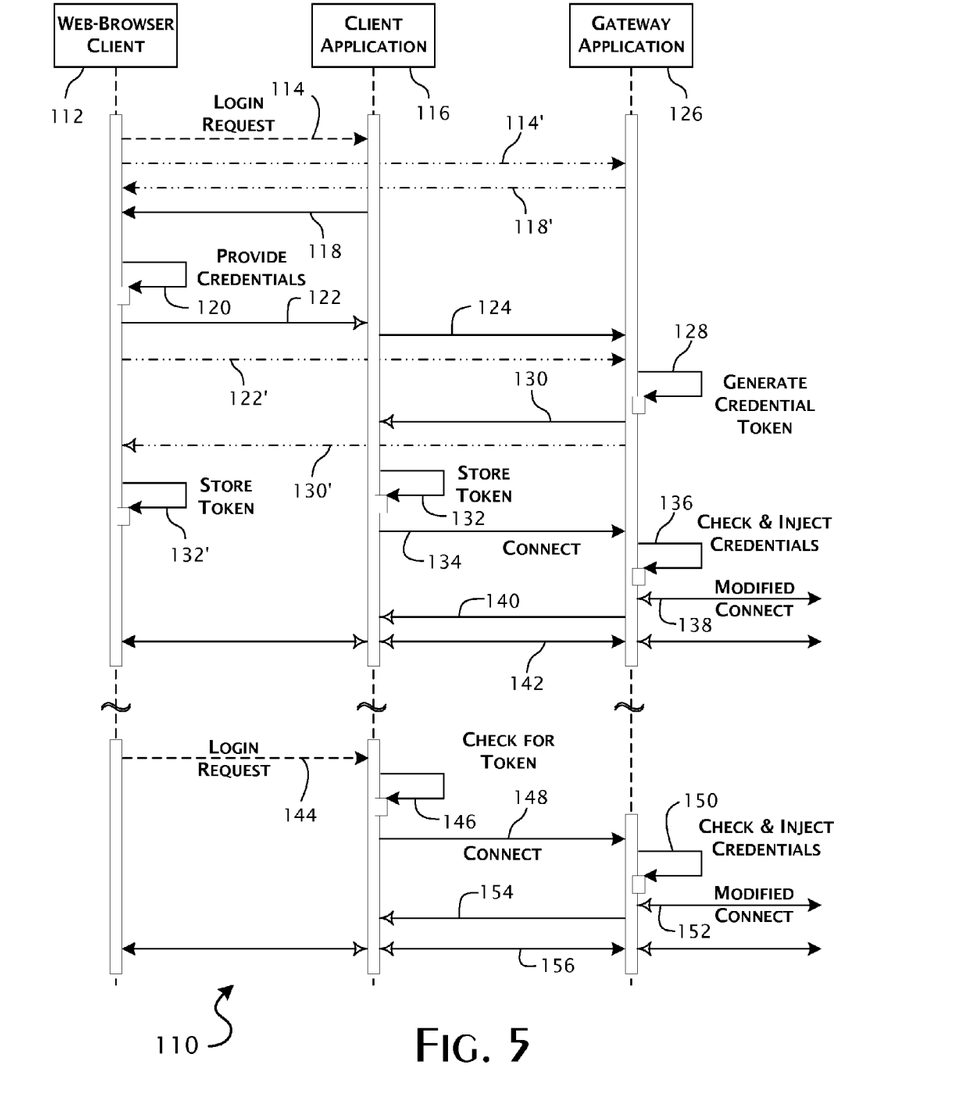
FIG. 5 is a sequence diagram illustrating the initialization and execution of a Web-browser client application in establishing a Web-service network connection in accordance with a preferred embodiment of the present invention.

A preferred operation flow 110 of a preferred embodiment of the present invention is generally shown in FIG. 5. An end user of the client system 32 typically initiates operation 110 through use of a Web-browser client 112 by directly or indirectly requesting 114 the execution of a Web client application 116. As typically implemented, the end user instructs the loading of a Web page that contains a reference to the Web client application 116. Evaluation of the reference by the Web-browser client 112 results in the loading and execution of the Web-client application 116. A login request 114 event occurs either as an implicit consequence of the initial execution of the Web-client application 116 or explicitly in response to activation of a graphical user interface element presented to the end user by the Web-browser client 112.

In a first, token-store embodiment, an initial login request 114 is directed to the client application 116. The client application 116 responds by presenting an authentication challenge 118 to the end user through the Web-browser client 112. The authentication challenge 118 is preferably realized as a login dialog requesting entry of corresponding user authentication credentials, typically represented as a user identifier and password tuple. The credentials are provided by the end user 120 and passed 122 to the Web client application 116. A secure, preferably HTTPS, connection 124 is established with the gateway application server 126, as executed by the gateway server 38, to present the user credentials for authentication. The connection 124 is effectively received and handled by the authorization control processor 90. This credential authentication request message preferably contains the user credentials and, preferably, an identification of a user role for which authentication is requested. The user role preferably defines a client access control categorization of the scope and nature of access to be authorized and is typically represented as a role identifier provided in the coding of the Web client application 116.

In a second, session-store embodiment, the login request 114' is directed to the gateway application 126. The response is a conventional HTTP authentication challenge 118' that presents a login dialog 120 for collection and return of user authentication credentials through a secure, preferably HTTPS, connection 122' to the gateway application 126.

On receipt of initial user credentials, the authorization control processor 90 evaluates 128 the user credentials for validity as a known user identifier and password tuple with respect to the identified user role. An external LDAP server 52 or equivalent may be consulted. A result message is then effectively returned 130, 130' to the Web-browser client 112 and Web client application 116. Where the authentication is failed, the authentication challenge 118, 118' is repeated.

On successful authentication in the token-store embodiment, the gateway application 126 further generates 128 a secure token containing the user credentials and returns 130 the secure token to the client application 116 for storage 132. In the preferred token-store embodiment of the present invention, the secure token is generated through encryption of the user credentials using a conventional private key encryption algorithm, where the private key is held securely by the gateway server application 126.

On successful authentication in the session-store embodiment, a secure session cookie containing the user credentials is also generated 128. The secure token is generated 128 as before, though containing a reference to the secure session cookie rather than the user credentials directly. The secure token is stored 132 by the client application 116 while the secure session cookie is returned 130' to the Web-browser client 112 for storage in the conventional local cookie store of the Web-browser client 112, which is conventionally distinct from the local store 72.

The client application 116 stores 132 the received secure token in the local storage associated with the client application 116. In accordance with the present invention, the Web-client application 116 allocates a local store 72 instance containing a keyring data structure providing for storage of secure tokens. Preferably, the local store 72 instances are allocated and managed through the keyring library using HTML5 compliant application programming interfaces (APIs) provided either natively by the Web-browser client 112 or through emulation provided by execution of the Web-Socket library 68. These APIs permit storing String data scoped as either session or local data. Alternately, other available technologies may be used by the keyring library to implement local store 72 instances. Web-browser plugins such as Adobe Flash or Google Gears, "userData" behaviors in Internet Explorer, or local database APIs in other Web-browsers may be used. Notably, access to a local store 72 instance is not necessarily secure. Access to a local store 72 instance is typically constrained only to origin scope of the client application 116 responsible for creating the local store 72 instance. Other Web client applications served from the same origin can access and read out the contents of a corresponding local store 72 instance.

Session scope corresponds to the execution lifespan of a Web-browser client 112 instance, specifically as represented by a Web-browser window, and further to the originating site of the Web-page document responsible for the loading of the Web client application 116. Web-browser windows are terminated on page changes and on Web-browser client shutdown. Web-browser shutdown is typically the result of a user directed execution termination of the Web-browser client 112. Session storage, as allocated within a local store 72 instance, is cleared on termination of the corresponding Web-browser window.

Local storage is similarly limited to the originating site of the Web-page document responsible for the loading of the Web client application 116, but is otherwise persistent. Local scope is thus persistent, allowing stored data to span multiple execution lifespans of the Web-browser client 112. Key values maintained in local storage until they explicitly purged by the Web client application 116, or until the local storage is cleared as a function of the Web-browser client 112.

Once the secure token has been stored 132, a connect or equivalent message is then sent 134 by the client application 116 for routing through the gateway application 126 to a desired Web service 70 executed on a remote server 44. Considering the Simple Text-Oriented Message Protocol (STOMP) as exemplary, the login request 114 represents a user request to initiate a STOMP conversation through the local execution of the client application 116, supported by a STOMP protocol-specific client library included in the WebSocket library 68. The STOMP protocol-specific client library enables the Web-client application 116 to exchange properly formatted STOMP messages through the gateway application 126 with a remote STOMP Web service 70. Other non-HTTP protocols that may be adapted in accordance with the present invention include, but are not limited to chat protocols, such as Extensible Messaging and Presence Protocol (XMPP), Internet Relay Chat (IRC), AOL Instant Messaging (AIM), and Skype Chat, Messaging protocols, such as Advanced Message Queue Protocol (AMQP), Simple Text-Oriented Messaging Protocol (STOMP), and TIBCO Rendezvous, and Gaming and media protocols, such as Open Game Protocol (OGP), and Virtual Network Computing (VNC).

In the preferred embodiment of the present invention, the connect message 134 is modified to transmit the secure token to the gateway application 126. The connect message, typically realized as a protocol specific data packet, includes defined user name and password fields that would nominally store the user credentials in clear text. The connect message is preferably modified to store a token marker and the secure token in place of the user credentials. In the case of the STOMP connect message, the token marker and secure token are stored in the password field of the connect data packet. The token marker is preferably a 'magic number' known to the authorization control processor 90 and used to identify a modified protocol packet. Different token markers are utilized to distinguish between token-store and session-store secure token types.

In the session-store embodiment, the connection 134 is initiated as an HTTP connection, thereby providing for the automatic transfer of the applicable session cookie to the gateway server 38. The HTTP connection is then upgraded to a WebSocket connection. The connect message is transferred once the WebSocket connection is established. Thus, in the token-store embodiment, the connect message directly includes the user credentials embedded and encrypted in the secure token. In the session-store embodiment, the secure token embedded in the connect message includes a secure reference to the session cookie that allows the authorization control processor 90 to uniquely associate the HTTP protocol delivered session cookie with the WebSocket connect message.

On receipt by the gateway server application 126, data packets are filtered based on protocol for examination by the packet inspection processor 92. Managed protocols, as defined by an administratively established network packet filtering configuration, are inspected to identify connect data packets, to further locate and extract the secure token provided the token marker is found, and to provide an identification of the packet protocol and copy of the secure token to the authorization control processor 90. The validity of a secure token is checked by decryption of the secure token and authentication of the recovered user credentials.

The user credentials recovered directly or indirectly from the secure token are then provided to the credential injection processor 94. The connect data packet is rewritten 136 with the user credentials to produce a modified connect message that is protocol compliant. In the case of a STOMP connect message, the user credentials are written to the user name and password fields. The modified connection message is then transmitted 138 to the remote Web service 70. A copy of the secure token is injected into a connection acknowledgment message returned 140 to the client application 116. Further transactional messages, conveying conversations in the case of the STOMP protocol, are transmitted and received 142.

Where, as preferred, the secure tokens are stored within the local scope of a local store 72 instance, a subsequent login request 144 can complete without repeating the authentication challenge 118. The login request 144 may follow an intended close of the connection or of the client application 116. The login request 144 may also be implicit due to the tear-down of the HTTP session underlying WebSocket connection used for the bidirectional transmission of transactional messages 142. The HTTP session tear-down may result from an explicit action implemented by the Web-browser client, such as a user instructed page change, or indirectly as a result of the ongoing execution of the client application 116. In both cases, an HTTP session tear-down event is recognized by the client application 116 and, dependent on the programmed implementation of the client application 116, a login request 114 may be implied in order to automatically reestablish the WebSocket connection.

On receipt of the login request 144, the Web-client application 116 checks 146 the local store 72 instance for a corresponding secure token. The token lookup is performed on the local store 72 instance that corresponds to the same site implicitly referenced by the login request 144. The token lookup is further performed against the keyring identifier name provided by the Web-client application 116. Where a valid secure token is not found, the Web-client application 116 proceeds to perform an authentication challenge 118, 118'. Provided a secure token is found and is valid, specifically not marked expired or invalid, the secure token is provided as part of the connect message 148. As before, the secure token is identified and protocol appropriate credentials are injected into the connect data packet 150 by the gateway server application 126 before transmission 152 to the remote Web service 70. A return connection acknowledgment message is preferably injected with the transaction corresponding secure token and returned 154 to the client application 116. Provided the Web-service connection is established, transactional messages are then transmitted and received 156.

Figure 6:
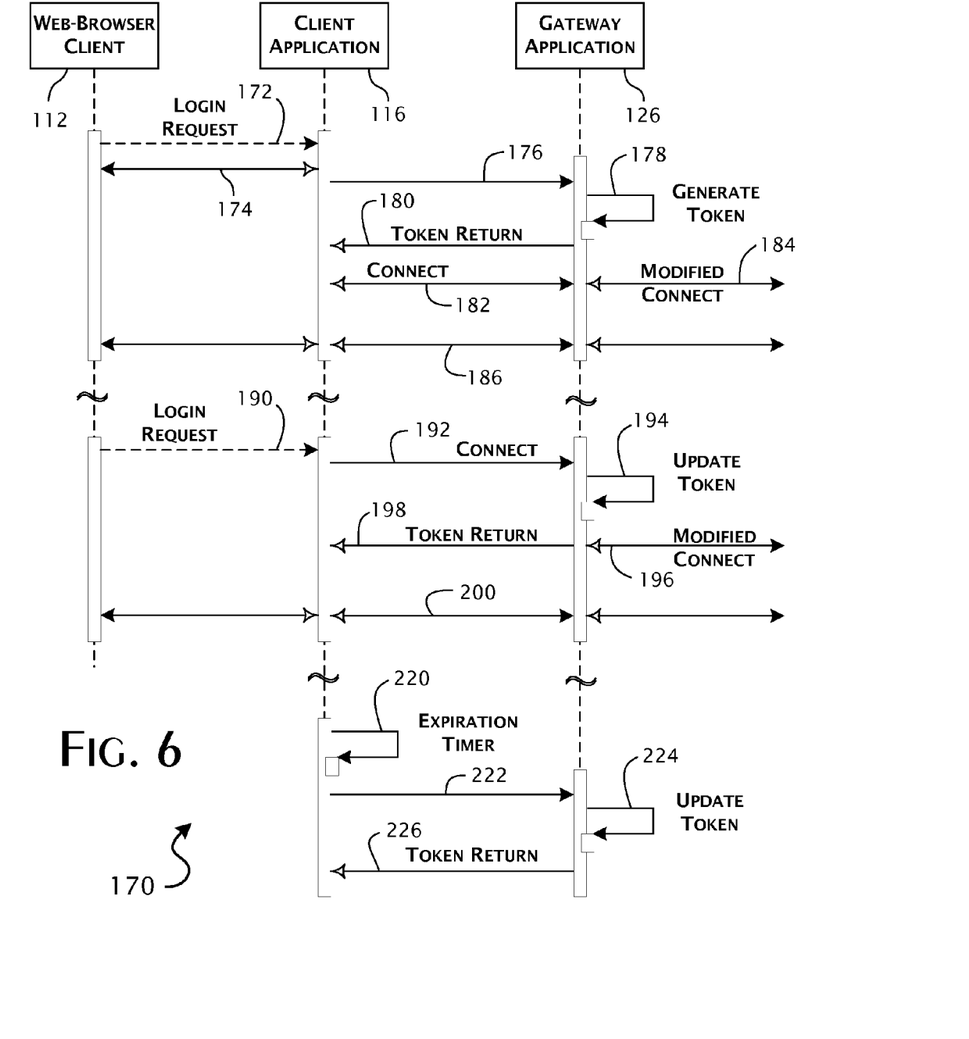
FIG. 6 is a sequence diagram further detailing the initialization and execution of a Web-browser client application in establishing a Web-service network connection in accordance with a preferred embodiment of the present invention.

In the preferred embodiments of the present invention, the secure token is both time stamped and sealed to reduce exposure to tampering and misuse. The process flows 170 describing the use and management of sealed, time stamped tokens are illustrated in FIG. 6. As above, in response to an initial login request 172, an authentication challenge 174 provides the Web client application 116 with user credentials. The authentication challenge 174 is appropriate where the keyring contains no current secure token corresponding to the current user and document site. A token request 176 is issued to the gateway server application 126 to present the user credentials and the user role as associated with the user by the client application 116. Provided authentication is successful, a secure token is generated 178 by the authorization control processor 90 and returned 180. As before, the client application 116 stores the received secure token in the local storage associated with the client application 116.

Figure 7:
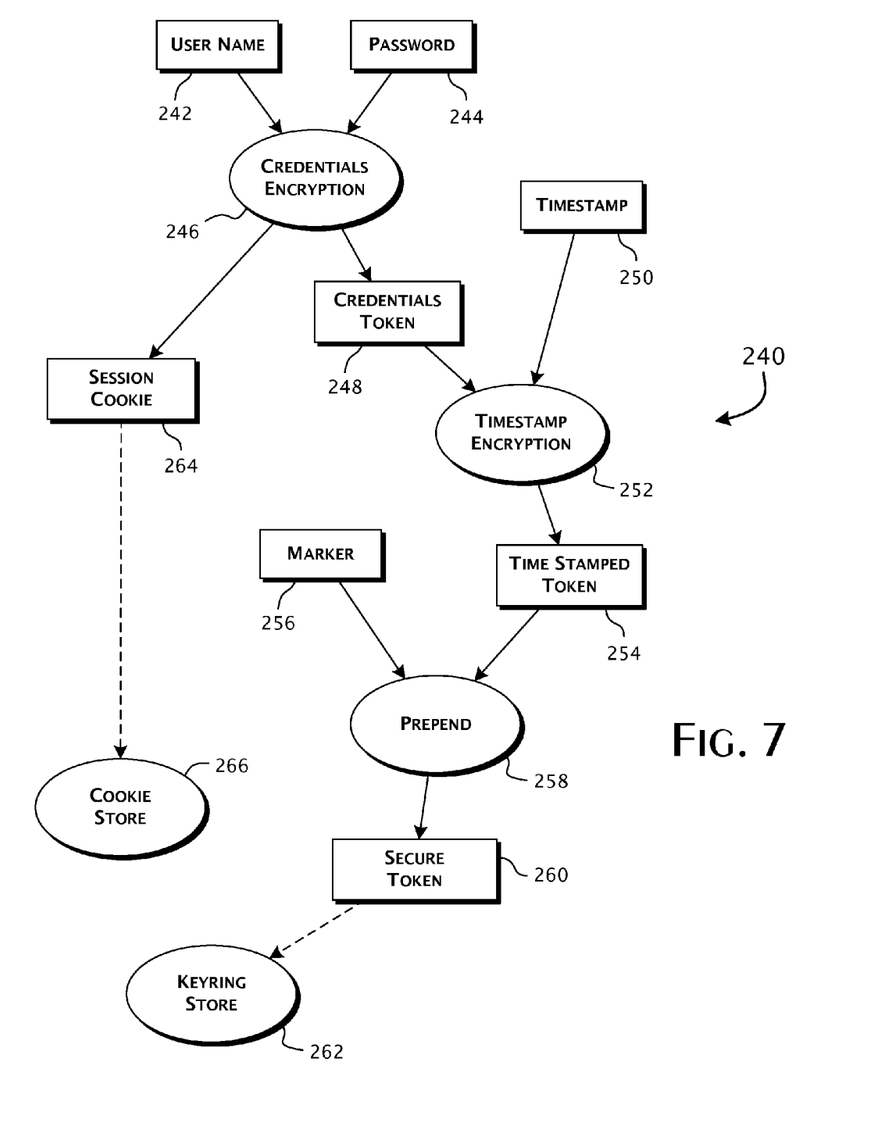
FIG. 7 is a flow diagram showing the preferred process of creating an authentication token for use by a preferred embodiment of the present invention.

Referring to FIG. 7, a preferred process 240 of generating a secure token, including timestamp, is shown. For the token-store embodiment, the user name 242 and password 244, as provided by the user credentials, are stored together in a data object and encrypted 246 to produce a sealed, secure credentials token 248. The encryption used is preferably a private key symmetric encryption where the private key is held securely by the gateway server application 126. This private key is not stored or accessible from a client system 32 so as to prevent a breach of client security from compromising the security of the sealed token 248 as stored by the client. Nominally, a generated, current-time relative timestamp data value 250 is then appended to the credentials token 248 and encrypted 252 to produce a timestamped token 254. Preferably, a separate private key valued symmetric encryption is used for the timestamp encryption 252, where the private key is again held secure by the gateway server application 126.

A marker 256 is then preferably prepended 258 to finally create a secure token 260 and returned 180 to the client application 116 for storage 262 in a corresponding keyring store 262 present in the local store 72 instance. The composition of the marker 256 is not significant provided it is a character string or other value unlikely to appear as part of a user name or password. The value of the marker 256 is maintained by the packet inspection processor 92 to allow differentiation between ordinary user credentials and an authorization token. The value of the marker 256 is also used to differentiate between an initially generated 178 secure token and a subsequently updated copy of the secure token. Preferably, the initial secure token generated 178 in connection with an authentication challenge is generated with an empty timestamp 250 field.

For the session-store embodiment, the generation of the secure token is substantially the same. Generation differs in that the encryption 246 produces a session cookie 264 containing the private key encrypted user credential data object. The session cookie 264 is returned in an HTTP header to the Web-browser client 112 for storage in the associated conventional cookie store 266. The encryption 246 further produces a session cookie reference used as the credentials token 248. This cookie reference is a valued identifier sufficiently unique to allow the authorization control processor 90, on examination of recently received and buffered HTTP headers, to uniquely identify and recover the corresponding session cookie 264. The session cookie reference is encrypted 252 with the timestamp 250 and, thereafter, used to create a secure token 260.

A protocol-specific connection request message is then sent 182 to the gateway server application 126. In preparing the connect message, a secure token is chosen by the client application 116 and embedded in the connect message. Preference, based on marker 256 values, is given to selecting a timestamped secure token 260 over an otherwise equivalent initial secure token 260. The connection request by the client application 116 is conditionally accepted by the authorization control processor 90 based on an evaluation of the service access controls. The timestamp value and user credentials are recovered from the connect message through a double decryption of the secure token, yielding the user credentials directly in the case of token-store and indirectly in the case of session-store. The user credentials are then authenticated against the authentication server 52 for the connect request identified role.

Connection authorization preferably also requires that the connection request be received by the packet inspection processor 92 within the time period defined by the timestamp value embedded in the secure token 260. The generated timestamp data value 250 preferably represents a time-to-live value typically on the order of thirty seconds to thirty minutes. In general, the time-to-live value is chosen empirically to cover some minimal interaction period between an end user and the Web service. Where the marker 256 value identifies the secure token 260 as an initial secure token 260, the connection request is presumed timely. Otherwise, the timestamp value is considered valid dependent, directly or indirectly, on the receipt time of the connect message by the packet inspection processor 92.

The recovered user credentials are then injected into the protocol-specific connect data packet prior to transition 184 to the remote Web service 70. On receipt of the connect acknowledgment message from the remote Web service, the connect acknowledgment message is preferably injected with an updated copy of the secure token and returned to the client application 116. The secure token is updated by adding or updating the timestamp value embedded in the secure token. Secure token injection is performed by the token injection processor 98 prior to transmission to the client application 116. On receipt, the updated secure token is stored in a corresponding keyring store 262 present in the local store 72 instance. Transactional messages may then be transmitted and received 186.

In response to subsequent implied and explicit login requests 190, the client application 116 will access the local keyring store 262 to retrieve a corresponding secure token 260. Where both initial and timestamped secure tokens are present, the timestamped secure token is selected provided the timestamp period has not expired. Preferably, the timestamp expiration period is an administratively established, but otherwise static time period value. Validity of a timestamped secure token can then be determined based on the time the timestamped secure token was last added or updated to the keyring store 262. Where a timestamped secure token 260 is not present or is not valid, the initial secure token 260 is selected. A connect message 192 is issued to the gateway server application 126 with the selected secure token 260.

By operation of the packet inspection processor 92 and authorization control processor 90, a copy of the secure token 260 is created containing an updated 194 timestamp value. A modified connection message 196 is issued by the gateway application 126 containing the injected user credentials. The updated authentication token 260 is, in turn, returned 196 in the connect acknowledgment message to the client application 116 and stored to the local keyring store 262. Provided that a connection is established, transactional messages may then be exchanged 200.

Preferably, timestamped secure tokens 260 are periodically updated by the client application 116 while the client application 116 continues execution. An expiration timer runs 220 to continuously monitor the expiration periods of authentication token 260 stored by the local keyring store 262. Preferably, the expiration timer 220 monitors expiration periods based on the time that each authentication token 260 is last added or updated to the local keyring store 262. Where a timestamped secure token 260 is approaching expiration, the expiration timer 220 initiates issuance of a corresponding token update message 222 to the gateway server application 126. The token update message 222 embedded the timestamped secure token 260. The authentication token 260 is extracted, updated 224, injected into a token update response message, and returned 226. On receipt of the token update response message, the updated secure token 260 is stored to the local keyring store 262.

In an alternate embodiment, the authorization control processor 90 may operate to support a cross-domain, single sign-on authentication system. Since management and use of the authentication tokens 260 functionally occurs at the Web-Socket protocol support level, certain domain limited constraints of the HTTP-based connections, as enforced by native Web-browser client applications 62, are avoided. The gateway server 38 and Web services 70 may exist in domains different from one another and, more significantly, different from that of the source server 66.

To support single sign-on, the multiple Web-client applications 116 are coded to store secure tokens in the same named keyring. Provided the Web-client applications 116 execute within the same referenced origin, the named keyring will be shared in the same local store 72 instance. The secure token, as initially created for any one of the Web-client applications 116 will be automatically used by any other similarly scoped login request 114, 114'. Provided that the single sign-on user credentials are valid for each protocol specific Web service, only the single authorization challenge is required to enable access to the multiple Web services. For the session-store embodiments, single sign-on is implicitly supported for any participating gateway server 38 within the declared scope of the session cookie. The session cookie will be automatically transmitted as part of the HTTP headers sent in communications within the defined scope of the cookie.

In another alternate embodiment, the user credentials injected under the direction of the authorization control processor 90 need not be the user credentials contained in the authentication token 260 as provided by a Web-client application 116. Instead, based on the user credentials and role identification provided the authorization control processor 90 may select a different set of user credentials for injection into a connect message. As part of the administratively managed client access controls, one or more alternate user credentials may be stored or accessed, directly or indirectly, by the gateway server 38 for evaluation and use by the authorization control processor 90. In particular, the gateway server 38 may interoperate with a Kerberos authentication system 52 or generate a number used once (nonce) to present a single use ticket-based service request as the user credentials submitted to a Web-service 70.

Thus, a system and methods for enabling the real-time exchange of data between Web clients and Web services through the management of state related information been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A computer implemented method, said method comprising the steps of:
    a) receiving, from a client application executed within a Web-browser client on a client system, a request to initiate a connection directed to a remote Web service, wherein said connection is identified by a communications protocol identifier, said step of receiving including the steps of:
        i) performing an authentication challenge directed to a user of said Web-browser client where a secure token is not present in a local store instance corresponding to said client application, wherein said secure token corresponds to said communications protocol identifier, and performing said authentication challenge includes receiving first user credentials at a gateway server, and providing said secure token from said gateway server to said client system, and said secure token includes a timestamp;
        ii) receiving a first connect message to said gateway server, wherein said connect message is protocol specific to said communications protocol identifier and wherein said first connect message includes said secure token; and
    b) initiating, from said gateway server, a connection directed to said remote Web service in response to receiving said first connect message, said step of initiating including the steps of:
        i) inspecting said first connect message to identify said secure token;
        ii) evaluating said secure token to obtain second user credentials;
        iii) injecting, in replacement of said secure token, said second user credentials into a second connect message corresponding to said first connect message; and
        iv) sending said second connect message to said remote Web service:
    wherein said secure token includes a timestamp, wherein said timestamp is determinative of whether said secure token is invalid, and wherein said step of performing determines said secure token to be not present in a local store instance where said secure token is invalid;
    wherein said client system:
        i) monitors said secure token, as stored in said local store instance, for an expiration of said timestamp;
        ii) sends said secure token to said gateway server for updating of said timestamp; and
        iii) stores said secure token, as updated by said gateway server, to said local store instance; and
    wherein said gateway server generates said secure token by private key encryption of said first user credentials to produce a sealed object and public key encryption of said sealed object and said timestamp.

2. The computer implemented method of claim 1 wherein said communications protocol identifier corresponds to a non-HTTP protocol.

3. The computer implemented method of claim 2 wherein said secure token includes an encrypted copy of said first user credentials.

4. The computer implemented method of claim 3 wherein said second user credentials are said first user credentials obtained by decryption of said secure token.

5. The computer implemented method of claim 1 wherein the request to initiate the connection directed to the remote Web service includes a request to initiate a WebSocket protocol connection.

6. The computer implemented method of claim 1 wherein said second user credentials are said first user credentials obtained by decryption of said secure token.

7. The computer implemented method of claim 6 wherein said secure token corresponds to a plurality of communications protocol identifiers.

8. A system, comprising:
    a communication interface configured to receive, from a client application executed within a Web-browser client on a client system, a request to initiate a connection directed to a remote Web service, wherein said connection is identified by a communications protocol identifier, wherein receiving the request includes:
        i) performing an authentication challenge directed to a user of said Web-browser client where a secure token is not present in a local store instance corresponding to said client application, wherein said secure token corresponds to said communications protocol identifier, and performing said authentication challenge includes receiving first user credentials at the system, and providing said secure token to said client system;

ii) receiving a first connect message, wherein said connect message is protocol specific to said communications protocol identifier and wherein said first connect message includes said secure token; and a processor coupled with the communication interface and configured to initiate, a connection directed to said remote Web service in response to receiving said first connect message, wherein initiating the connection includes:
  i) inspecting said first connect message to identify said secure token;
  ii) evaluating said secure token to obtain second user credentials;
  iii) injecting, in replacement of said secure token, said second user credentials into a second connect message corresponding to said first connect message; and
  iv) sending said second connect message to said remote Web service;

wherein said secure token includes a timestamp, wherein said timestamp is determinative of whether said secure token is invalid, and wherein said step of performing determines said secure token to be not present in a local store instance where said secure token is invalid;

wherein said client system:
  i) monitors said secure token, as stored in said local store instance, for an expiration of said timestamp;
  ii) sends said secure token to the system for updating of said timestamp; and
  iii) stores said secure token, as updated by the system, to said local store instance; and
wherein the system generates said secure token by private key encryption of said first user credentials to produce a sealed object and public key encryption of said sealed object and said timestamp.

9. The system of claim 8, wherein said communications protocol identifier corresponds to a non-HTTP protocol.

10. The system of claim 9, wherein said secure token includes an encrypted copy of said first user credentials.

11. The system of claim 10, wherein said second user credentials are said first user credentials obtained by decryption of said secure token.

12. The system of claim 8, wherein the request to initiate the connection directed to the remote Web service includes a request to initiate a WebSocket protocol connection.

13. The system of claim 8, wherein said second user credentials are said first user credentials obtained by decryption of said secure token.

14. The system of claim 13, wherein said secure token corresponds to a plurality of communications protocol identifiers.

15. A computer program product, the computer program product being embodied in a non-transitory tangible computer readable storage medium and comprising computer instructions for:
  a) receiving, from a client application executed within a Web-browser client on a client system, a request to initiate a connection directed to a remote Web service, wherein said connection is identified by a communications protocol identifier, said step of receiving including the steps of:
    i) performing an authentication challenge directed to a user of said Web-browser client where a secure token is not present in a local store instance corresponding to said client application, wherein said secure token corresponds to said communications protocol identifier, and performing said authentication challenge includes receiving first user credentials at a gateway server, and providing said secure token from said gateway server to said client system;
    ii) receiving a first connect message to said gateway server, wherein said connect message is protocol specific to said communications protocol identifier and wherein said first connect message includes said secure token; and
  b) initiating, from said gateway server, a connection directed to said remote Web service in response to receiving said first connect message, said step of initiating including the steps of:
    i) inspecting said first connect message to identify said secure token;
    ii) evaluating said secure token to obtain second user credentials;
    iii) injecting, in replacement of said secure token, said second user credentials into a second connect message corresponding to said first connect message; and
    iv) sending said second connect message to said remote Web service;

wherein said secure token includes a timestamp, wherein said timestamp is determinative of whether said secure token is invalid, and wherein said step of performing determines said secure token to be not present in a local store instance where said secure token is invalid;

wherein said client system:
  i) monitors said secure token, as stored in said local store instance, for an expiration of said timestamp;
  ii) sends said secure token to said gateway server for updating of said timestamp; and
  iii) stores said secure token, as updated by said gateway server, to said local store instance; and
wherein said gateway server generates said secure token by private key encryption of said first user credentials to produce a sealed object and public key encryption of said sealed object and said timestamp.

16. The computer program product of claim 15, wherein said communications protocol identifier corresponds to a non-HTTP protocol.

17. The computer program product of claim 16, wherein said secure token includes an encrypted copy of said first user credentials.

18. The computer program product of claim 17, wherein said second user credentials are said first user credentials obtained by decryption of said secure token.

19. The computer program product of claim 15 wherein the request to initiate the connection directed to the remote Web service includes a request to initiate a WebSocket protocol connection.

20. The computer program product of claim 15, wherein said second user credentials are said first user credentials obtained by decryption of said secure token.

21. The computer program product of claim 20, wherein said secure token corresponds to a plurality of communications protocol identifiers.

* * * * *